US007023125B2

(12) United States Patent
Kuboi et al.

(10) Patent No.: US 7,023,125 B2
(45) Date of Patent: Apr. 4, 2006

(54) ULTRASONIC-MOTOR DRIVING APPARATUS

(75) Inventors: Toru Kuboi, Akishima (JP); Tomoki Funakubo, Hachioji (JP)

(73) Assignee: Olympus Corporation, Tokyo (JP)

( * ) Notice: Subject to any disclaimer, the term of this patent is extended or adjusted under 35 U.S.C. 154(b) by 182 days.

(21) Appl. No.: 10/818,651

(22) Filed: Apr. 6, 2004

(65) Prior Publication Data

US 2004/0201307 A1 Oct. 14, 2004

(30) Foreign Application Priority Data

Apr. 9, 2003 (JP) ............................ 2003-105739

(51) Int. Cl.
*H02N 2/00* (2006.01)

(52) U.S. Cl. ...................................................... 310/317

(58) Field of Classification Search ................. 310/317
See application file for complete search history.

(56) References Cited

U.S. PATENT DOCUMENTS 5,159,253 A * 10/1992 Shimizu et al. ............. 318/606
6,486,743 B1 * 11/2002 Hasegawa et al. ............ 331/25
2001/0004179 A1 * 6/2001 Iino et al. ................... 310/314

FOREIGN PATENT DOCUMENTS

JP 6-296378 10/1994

* cited by examiner

*Primary Examiner*—Thomas M. Dougherty
(74) *Attorney, Agent, or Firm*—Scully, Scott, Murphy & Presser

(57) ABSTRACT

An ultrasonic-motor driving apparatus includes an ultrasonic motor, a driving unit, and a characteristic storage. The driving unit is detachable from the ultrasonic motor and has a driving circuit for driving the ultrasonic motor. The characteristic storage provided in the ultrasonic motor stores driving characteristic values of a resonant frequency and a drive voltage signal specific to the ultrasonic motor. The driving circuit drives and controls the ultrasonic motor based on the driving characteristic values stored in the characteristic storage.

20 Claims, 6 Drawing Sheets

ULTRASONIC-MOTOR DRIVING APPARATUS

This application claims benefit of Japanese Application No. 2003-105739 filed in Japan on Apr. 9, 2003, the contents of which are incorporated by this reference.

BACKGROUND OF THE INVENTION

1. Field of the Invention

The present invention relates to an improvement in an ultrasonic-motor driving apparatus that includes an ultrasonic motor having as a driving source an electromechanical-energy conversion element, such as a layered piezoelectric element, and a driving circuit for the ultrasonic motor.

2. Description of the Related Art

Downsizing of products such as electronic components has been increasingly requested in recent years and reduction in size of motor products, such as an electromotive stage, has been also required. Ultrasonic motors, which provide a larger torque while being smaller than electromagnetic motors, have drawn attention as motors available for downsizing.

Many ultrasonic motors generally utilize frictional force generated in an area where a transducer is in contact with a driven body for driving. With such an ultrasonic motor, the area undergoing friction is intensively worn and, therefore, there are many cases where the ultrasonic motor itself must be replaced with a new one. Hence, ultrasonic-motor driving apparatuses are strongly required in which a new ultrasonic motor can be efficiently driven with higher precision and which do not require a complicated adjustment of a driving circuit, that is, in which the ultrasonic motor is compatible with the driving circuit.

Known technologies pertaining to ultrasonic-motor driving apparatuses include a drive circuit of an ultrasonic motor disclosed in Japanese Unexamined Patent Application Publication No. 6-296378, which is filed by the applicant.

As described in a third embodiment of the specification (pages 5–6) disclosed in the publication, the drive circuit of an ultrasonic motor has a memory for storing values of resonant frequencies specific to an ultrasonic transducer in the ultrasonic motor at its ultrasonic-transducer side (an ultrasonic motor 10 in FIG. 10). The drive circuit of an ultrasonic motor is structured so as to drive the ultrasonic transducer based on the values stored in the memory.

With this structure, even when the ultrasonic motor (a lens 16 in the third embodiment and in FIG. 10) has been replaced in whole with a new one, the ultrasonic motor can be driven in accordance with the resonant frequency of the new ultrasonic transducer.

SUMMARY OF THE INVENTION

An ultrasonic-motor driving apparatus includes an ultrasonic motor, a driving unit, and a characteristic storage. The driving unit is detachable from the ultrasonic motor and has a driving circuit for driving the ultrasonic motor. The characteristic storage provided in the ultrasonic motor stores driving characteristic values of a resonant frequency and a drive voltage signal specific to the ultrasonic motor. The driving circuit drives and controls the ultrasonic motor based on the driving characteristic values stored in the characteristic storage.

The objects and advantages of the present invention will become further apparent from the following detailed explanation.

DESCRIPTION OF THE PREFERRED EMBODIMENTS

Embodiments of the present invention will be described below with reference to the drawings.

First Embodiment (Structure)

Figure 1:
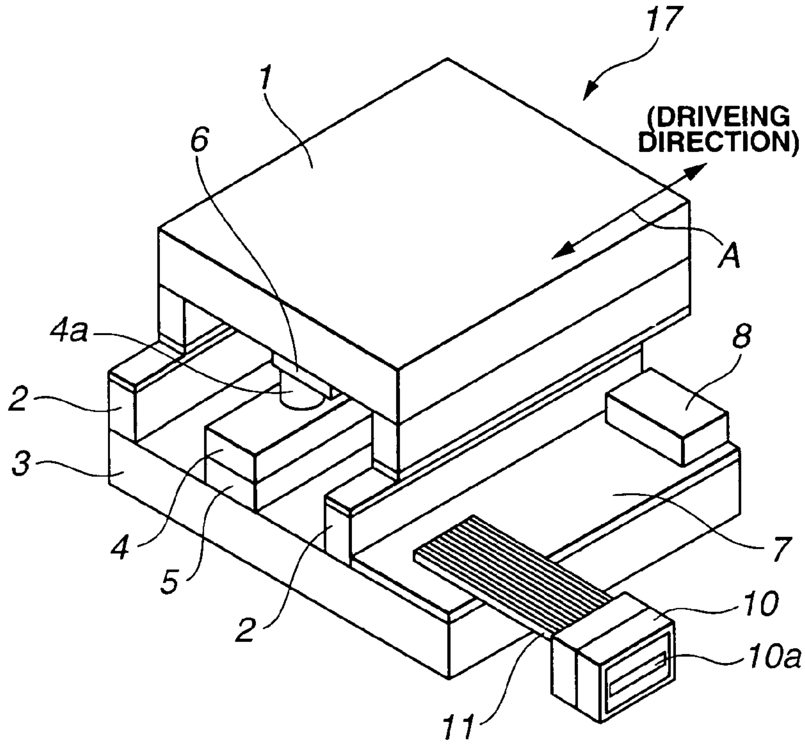
FIG. 1 is a perspective view showing the external configuration of an ultrasonic motor in an ultrasonic-motor driving apparatus according to a first embodiment of the present invention.
Figure 2:
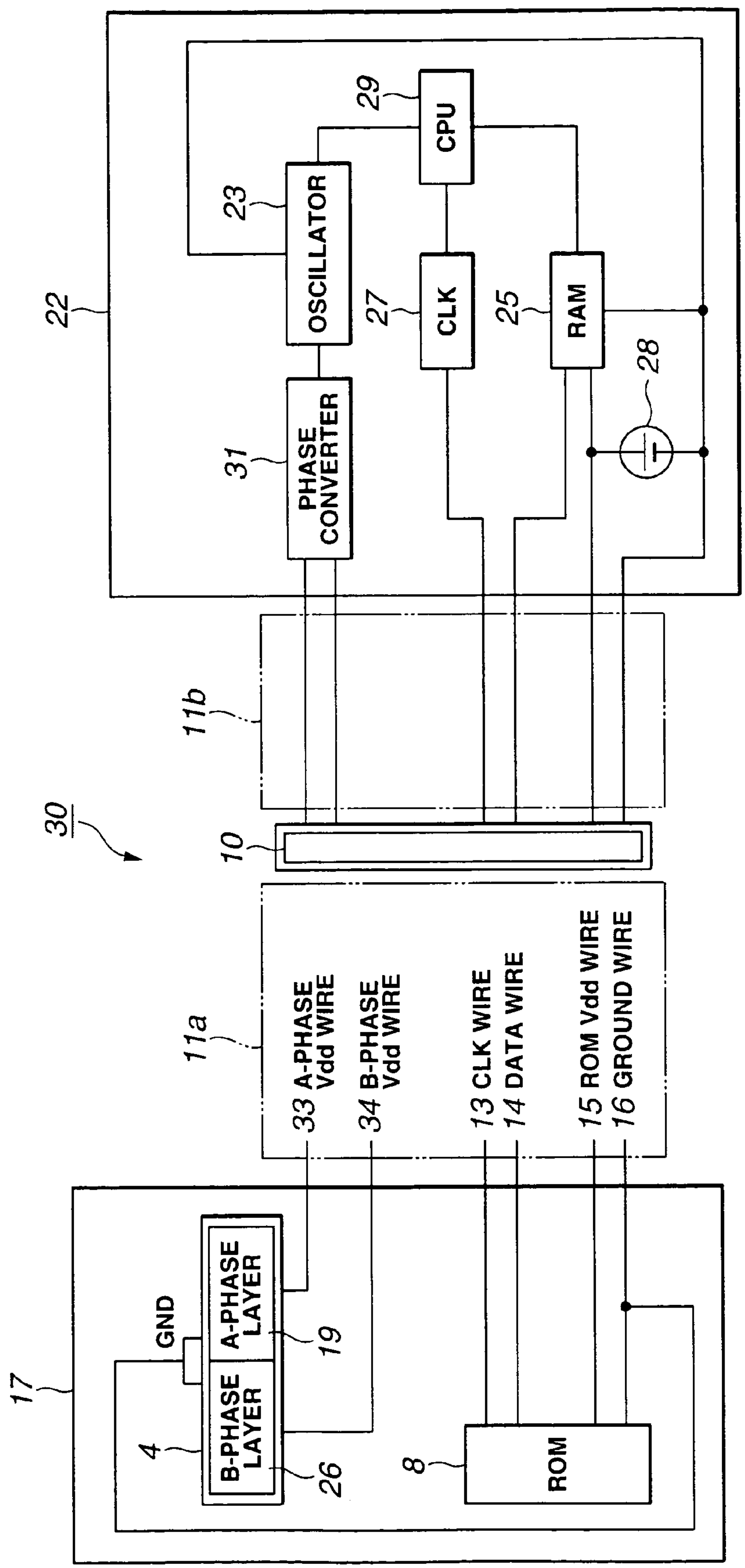
FIG. 2 is a block diagram showing the electrical circuitry of the ultrasonic-motor driving apparatus of the first embodiment.

FIGS. 1 and 2 illustrate an ultrasonic-motor driving apparatus according to a first embodiment of the present invention. FIG. 1 is a perspective view showing the external configuration of an ultrasonic motor in the ultrasonic-motor driving apparatus. FIG. 2 is a block diagram showing the electrical circuitry of the ultrasonic-motor driving apparatus.

An ultrasonic-motor driving apparatus 30 mainly includes a detachable ultrasonic motor 17 and a detachable driving circuit 22, as shown in FIG. 2.

The external configuration of the ultrasonic motor 17 will now be described with reference to FIG. 1. Referring to FIG. 1, the ultrasonic motor 17 has a slider 1, a pair of linear-motion guides 2, a base 3, an ultrasonic transducer (hereinafter referred to as a transducer) 4, a pressing mechanism 5, a plate 6, a board 7, a ROM 8, a connector 10, and a transmission line 11.

The slider 1 is held by the pair of linear-motion guides 2, such as cross roller guides, and is disposed on the base 3 so as to provide linear reciprocating motion in a driving direction (a direction shown by an arrow A) in FIG. 1.

The transducer 4 having a frictional contact 4*a* mounted thereon is provided between the base 3 and the slider 1. The transducer 4 is vertically pressed toward the slider 1 with a predetermined pressure by the pressing mechanism 5. The plate 6 is fixed beneath the bottom face of the slider 1 opposing the transducer 4. The frictional contact 4*a* on the transducer 4 is in contact with the plate 6.

The board 7 on which electronic components required for driving and controlling the ultrasonic motor 17 are mounted is provided on the proximal-end-side top face of the base 3. The board 7 is disposed at a position appropriate for reduction in size of the ultrasonic motor 17, that is, in a free area on the base 3 where the pair of linear-motion guides 2 and the slider 1 and the like are disposed. The ROM 8 and the connector 10 are provided on the board 7.

The ROM 8 stores values of a resonant frequency Fr and a drive voltage V that are optimal for driving the ultrasonic motor 17. The drive voltage V includes two parameters, that is, a forward drive voltage V1 and a backward drive voltage V2.

The board 7 is electrically connected to a transmission line 11*b* of the driving circuit 22 in FIG. 2 through the connector 10 and a transmission line 11*a*. Connecting a connecting part 10*a* of the connector 10 to the transmission line 11*b* provides electrical connection.

According to the first embodiment, the ROM 8 is desirably a nonvolatile ROM connected in series. The drive voltage V may be a peak value or an actual value of an alternating voltage.

Each of the pair of linear-motion guides 2 may have any shape in which the slider 1 can move straightly in the direction shown by the arrow A. For example, the linear-motion guide 2 may be a concaved guide or a V-shaped guide. The pressing mechanism 5 may be in any shape as long as it has a characteristic of vertically pressing the transducer 4 toward the slider 1 with a predetermined pressure, such as an elastic body or a spring.

The electrical circuitry of the ultrasonic-motor driving apparatus having the ultrasonic motor and the driving circuit described above, according to the first embodiment, will now be described in detail with reference to FIG. 2.

Referring to FIG. 2, the ultrasonic-motor driving apparatus 30 of the first embodiment has the ultrasonic motor 17, the driving circuit 22 for driving and controlling the ultrasonic motor 17, the connector 10 for electrically connecting the ultrasonic motor 17 and the driving circuit 22, and the transmission lines 11*a* and 11*b*.

The driving circuit 22 includes an oscillator 23, a RAM 25, a CLK oscillator (shown by CLK in FIG. 2) 27, a direct-current power supply 28, a CPU 29 serving as a controller, and a phase converter 31, as shown in FIG. 2.

The electrical connection in the ultrasonic-motor driving apparatus 30 having the electrical circuitry described above will now be described. The transmission lines 11*a* and 11*b* include six lead wires; that is, a CLK wire 13, a data wire 14, a ROM Vdd wire 15, a ground wire 16, an A-phase Vdd wire 33, and a B-phase Vdd wire 34.

The ultrasonic-motor 17-side end of the CLK wire 13 is connected to a CLK electrode of the ROM 8 through the connector 10, and the driving-circuit 22-side end thereof is connected to the CLK oscillator 27.

The ultrasonic-motor 17-side end of the data wire 14 is connected to a data electrode of the ROM 8 through the connector 10, and the driving-circuit 22-side end thereof is connected to a data electrode of the RAM 25.

The ultrasonic-motor 17-side end of the ROM Vdd wire 15 is connected to a power-supply electrode of the ROM 8 through the connector 10, and the driving-circuit 22-side end thereof is connected to the direct-current power supply 28 capable of driving the ROM 8 and the RAM 25.

The ultrasonic-motor 17-side end of the ground wire 16 is connected to a ground electrode of the ROM 8 and a ground electrode of the transducer 4 through the connector 10, and the driving-circuit 22-side end thereof is connected to a ground terminal of the oscillator 23 and a ground terminal of the direct-current power supply 28.

The ultrasonic-motor 17-side end of the A-phase Vdd wire 33 is connected to an electrode of an A-phase layer 19 in the transducer 4 through the connector 10, and the driving-circuit 22-side end thereof is connected to one terminal of the phase converter 31.

The ultrasonic-motor 17-side end of the B-phase Vdd wire 34 is connected to an electrode of a B-phase layer 26 in the transducer 4 through the connector 10, and the driving-circuit 22-side end thereof is connected to the other terminal of the phase converter 31.

The CPU 29 is electrically connected to the oscillator 23, the RAM 25, and the CLK oscillator 27.

The oscillator 23 can modify the frequency and voltage of the alternating voltage to be generated in accordance with an instruction from the CPU 29, and can modify a phase difference of the alternating voltage with the phase converter 31 electrically connected to the oscillator 23.

Accordingly, the CPU 29 provides various controls of the entire ultrasonic-motor driving apparatus 30. Namely, the CPU 29 controls oscillation of the oscillator 23, drive of the CLK oscillator 27, writing and reading data to and from the RAM 25, and so on.

(Operation)

The operation of the ultrasonic-motor driving apparatus of the first embodiment will now be described with reference to FIGS. 1 and 2.

It is assumed that the ultrasonic motor 17 is to be replaced with a new ultrasonic motor 17 for the purpose of repair, inspection, or the like.

The ultrasonic motor 17 is electrically connected to the driving circuit 22 through the connector 10.

Power is applied from a power source (not shown) to the ultrasonic-motor driving apparatus 30.

The application of the power to the ultrasonic-motor driving apparatus 30 invokes the CPU 29 serving as a controller. The CPU 29 causes the direct-current power supply 28 in the driving circuit 22 to apply a voltage to the ROM 8 through the ROM Vdd wire 15 for starting up the ROM 8.

The CPU 29 then specifies a data storage area in the RAM 25 in which data can be written.

After starting up the CLK oscillator 27, the CPU 29 causes the CLK oscillator 27 to transmit a CLK signal (clock signal) to the ROM 8 through the CLK wire 13.

The ROM 8 receives the transmitted CLK signal and transmits the written value to the RAM 25 through the data wire 14. After the data is transmitted to the driving circuit 22, the CPU 29 receives the transmitted data and temporarily writes the received data value at least in the RAM 25 for storage.

After writing the data in the RAM 25, the CPU 29 causes the CLK oscillator 27 to stop the oscillation and also causes the ROM 8 to terminate the data transmission.

The CPU 29 then determines a drive frequency Fr1 and a drive voltage V at which the ultrasonic motor 17 is driven with reference to the value written in the RAM 25, and causes the oscillator 23 to output the determined value. The oscillator 23 generates the drive frequency Fr1 and the drive voltage V optimal for driving the ultrasonic motor 17 based on the instruction supplied from the CPU 29. The resonant frequency Fr is ordinarily equal to the drive frequency Fr1.

The alternating voltage generated in the oscillator 23 is applied to the A-phase layer 19 and the B-phase layer 26 in the transducer 4 through the phase converter 31, the A-phase Vdd wire 33, and the B-phase Vdd wire 34 for driving the ultrasonic motor 17.

The alternating voltage has a predetermined phase difference given by the phase converter 31. In order to switch the forward motion to the backward motion in the ultrasonic motor 17, the CPU 29 reverses the phase difference given by the phase converter 31 by 180°. In order to reverse the phase, the CPU 29 changes the drive voltage V generated in the oscillator 23 from the forward drive voltage V1 to the backward drive voltage V2, or from the backward drive voltage V2 to the forward drive voltage V1, with reference to the value written in the RAM 25.

Hence, when the ultrasonic motor 17 is replaced with a new ultrasonic motor 17, connecting the new ultrasonic motor 17 (now shown) to the connector 10 modifies the drive frequency Fr1 and the drive voltage V to values corresponding to the new ultrasonic motor 17 based on the controls described above, so that it is possible to drive the new ultrasonic motor 17 in an optimum state. The new ultrasonic motor 17 must be structured in the same manner as the ultrasonic motor 17 of the first embodiment.

(Advantages)

According to the first embodiment, only the ROM 8 is included in the ultrasonic motor 17 serving as a driven body. Since components including the oscillator 23 and so on are incorporated in the driving circuit 22, not in the ultrasonic motor 17, it is possible to structure the ultrasonic-motor driving apparatus 30 in which the ultrasonic motor 17 is compatible with the driving circuit 22 in a state where the ultrasonic motor 17 is reduced in size as much as possible.

The RAM 25 is not necessarily separated from the CPU 29 in the first embodiment. The RAM 25 may be integrated with the CPU 29 to form a one-chip microcomputer.

The same operation and advantages are provided even when the drive voltage V is replaced with a phase difference P of the drive voltage.

Second Embodiment (Structure)

Figure 3:
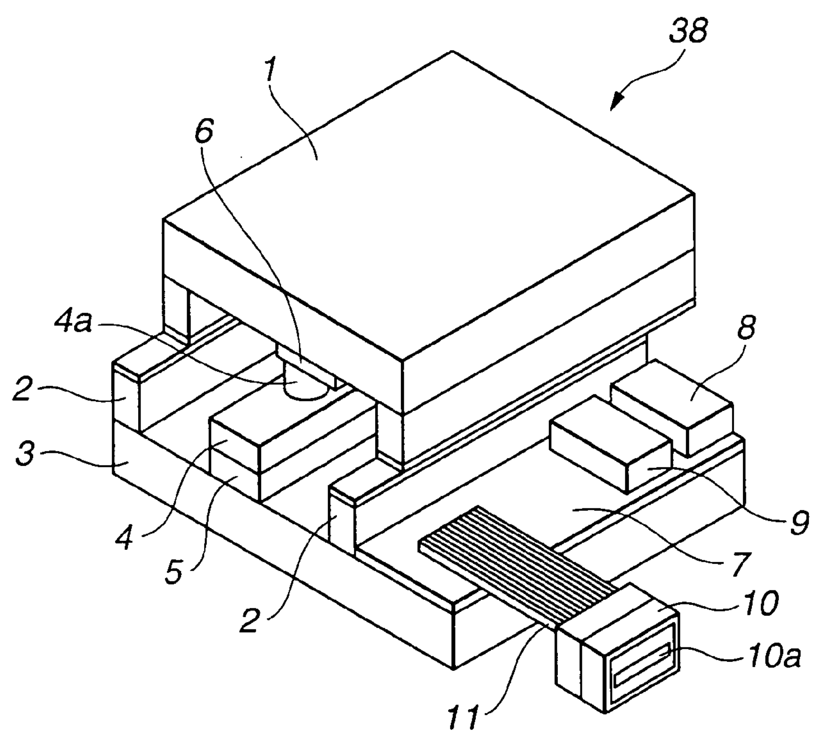
FIG. 3 is a perspective view showing the external configuration of an ultrasonic motor in an ultrasonic-motor driving apparatus according to a second embodiment of the present invention.
Figure 4:
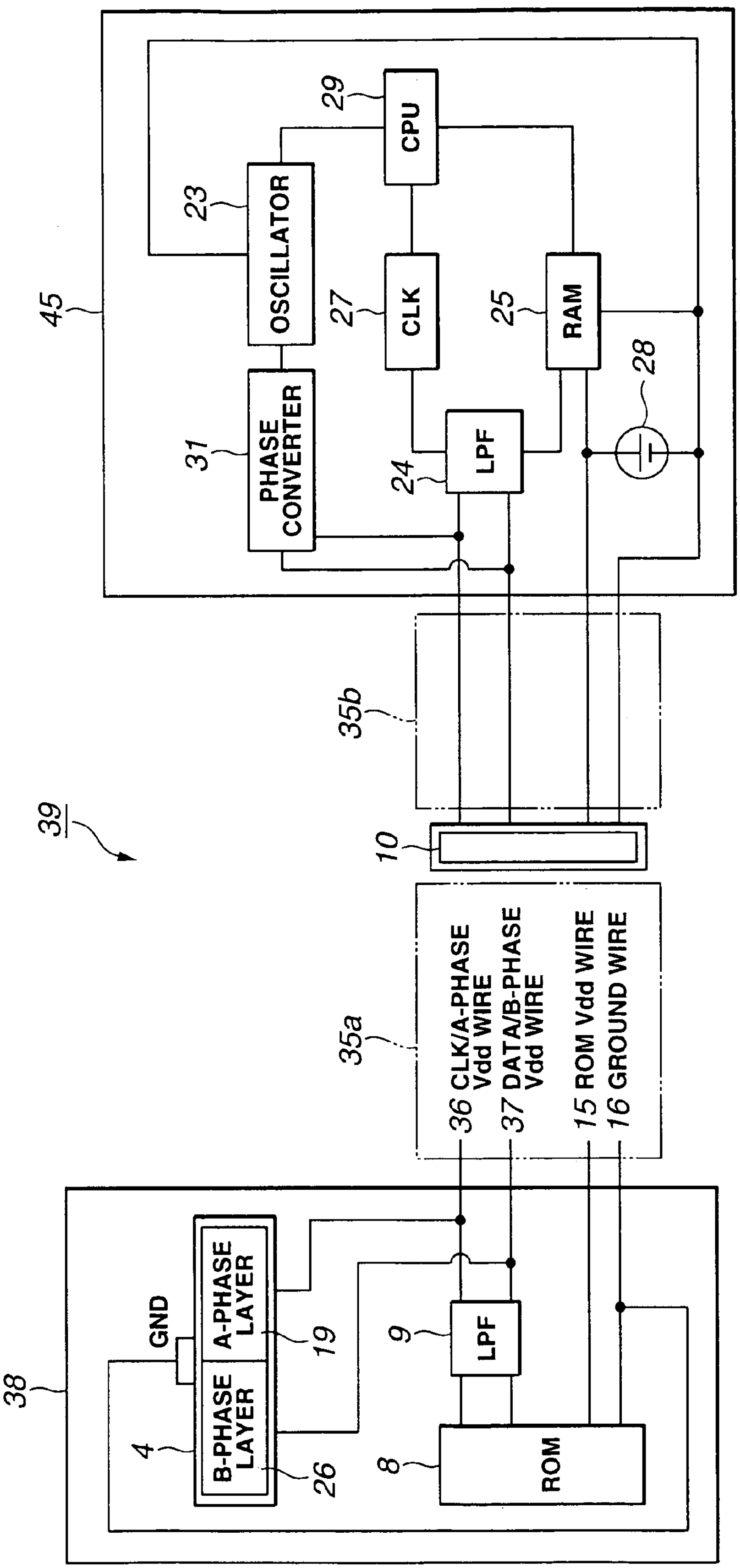
FIG. 4 is a block diagram showing the electrical circuitry of the ultrasonic-motor driving apparatus of the second embodiment.

FIGS. 3 and 4 illustrate an ultrasonic-motor driving apparatus according to a second embodiment of the present invention. FIG. 3 is a perspective view showing the external configuration of an ultrasonic motor in the ultrasonic-motor driving apparatus. FIG. 4 is a block diagram showing the electrical circuitry of the ultrasonic-motor driving apparatus. The same reference numerals are used in FIGS. 3 and 4 to identify the same components as in the ultrasonic-motor driving apparatus of the first embodiment. The description of such components is omitted here and only the components different from those in the ultrasonic-motor driving apparatus of the first embodiment will be described.

The ultrasonic-motor driving apparatus of the second embodiment is characterized in that the number of the transmission lines for connecting the ultrasonic motor to a driving circuit is decreased and low-pass filters (LPFs) are added in order to reduce in size of the ultrasonic motor and the entire ultrasonic-motor driving apparatus, as in the first embodiment.

Referring to FIG. 3, the ultrasonic-motor driving apparatus 39 of the second embodiment has the board 7 on the base 3, as in the first embodiment, while the LPF 9 is provided on the board 7, in addition to the ROM 8 and the connector 10. The LPF 9 desirably has a cutoff frequency of around 20 KHz.

Other structures are the same as in the first embodiment.

The electrical circuitry of the ultrasonic-motor driving apparatus having the ultrasonic motor and the driving circuit described above, according to the second embodiment, will now be described in detail with reference to FIG. 4.

The LPF 24 is added in a driving circuit 45 in an ultrasonic-motor driving apparatus 39 of the second embodiment, as shown in FIG. 4.

Transmission lines 35*a* and 35*b* each include four lead wires; that is, a CLK/A-phase Vdd wire 36, a data/B-phase Vdd wire 37, the ROM Vdd wire 15, and the ground wire 16.

The ultrasonic-motor 38-side end of the CLK/A-phase Vdd wire 36 is connected to an electrode of the A-phase layer 19 in the transducer 4 through the connector 10 and is connected to a CLK electrode of the ROM 8 through the LPF 9. The driving-circuit 45-side end of the CLK/A-phase Vdd wire 36 is connected to one terminal of the phase converter 31 and is connected to the CLK oscillator 27 through the LPF 24.

The ultrasonic-motor 38-side end of the data/B-phase Vdd wire 37 is connected to an electrode of the B-phase layer 26 in the transducer 4 through the connector 10 and is connected to a data electrode of the ROM 8 through the LPF 9. The driving-circuit 45-side end of the data/B-phase Vdd wire 37 is connected to the other terminal of the phase converter 31 and is connected to a data electrode of the RAM 25 through the LPF 24.

As described above, according to the second embodiment, the CLK wire 13 and the data wire 14 in the first embodiment are eliminated, and the CLK/A-phase Vdd wire 36 and the data/B-phase Vdd wire 37 are used to constitute dual-purpose lines for transmitting both CLK signals and data. In order to realize the dual-purpose lines, the LPF 9 and the LPF 24 for transmitting data and inhibiting CLK signals from being transmitted are provided in the ultrasonic motor 38 and the driving circuit 45, respectively.

Other structures of the driving circuit 45 are the same as in the first embodiment.

(Operation)

The operation of the ultrasonic-motor driving apparatus of the second embodiment will now be described with reference to FIGS. 3 and 4.

According to the second embodiment, the operation until the CPU 29 specifies a data storage area in the RAM 25 in which data can be written is the same as in the first embodiment.

After starting up the CLK oscillator 27, the CPU 29 causes the CLK oscillator 27 to transmit a CLK signal to the ROM 8 through the CLK/A-phase Vdd wire 36.

The ROM 8 receives the transmitted CLK signal and transmits the written value to the RAM 25 thorough the data/B-phase Vdd wire 37. After the data is transmitted to the driving circuit 45, the CPU 29 receives the transmitted data and writes the received data value in the RAM 25 for storage.

Since a data transfer frequency at this time is lower than the cutoff frequency of the LPF 9, the received data value can be transmitted to the RAM 25 through the LPF 9.

As in the first embodiment, after writing the data in the RAM 25, the CPU 29 causes the CLK oscillator 27 to stop the oscillation and also causes the ROM 8 to terminate the data transmission.

The CPU 29 then, as in the first embodiment, determines a drive frequency Fr1 and a drive voltage V at which the ultrasonic motor 38 is driven with reference to the value written in the RAM 25, and causes the oscillator 23 to output the determined value. The oscillator 23 generates the drive frequency Fr1 and the drive voltage V optimal for driving the ultrasonic motor 38 based on the instruction supplied from the CPU 29. The resonant frequency Fr is ordinarily equal to the drive frequency Fr1.

The CPU 29 applies the alternating voltage generated in the oscillator 23 to the A-phase layer 19 and the B-phase layer 26 in the transducer 4 through the CLK/A-phase Vdd wire 36 and the data/B-phase Vdd wire 37, respectively, for driving the ultrasonic motor 38.

The drive frequency Fr1 of a common ultrasonic motor is 20 KHz or more, which is higher than the cutoff frequency of the LPF 9. Hence, the alternating voltage is cut off by the LPF 9 and, therefore, is not applied to the ROM 8, thus preventing the ROM 8 from being damaged.

Similarly, the alternating voltage is cut off by the LPF 24 and, therefore, is not applied to the RAM 25 and the CLK oscillator 27, thus preventing the RAM 25 from being damaged.

Hence, when the ultrasonic motor 38 is replaced with a new ultrasonic motor 38, connecting the new ultrasonic motor 38 (now shown) to the connector 10 modifies the drive frequency Fr1 and the drive voltage V to values corresponding to the new ultrasonic motor 38 based on the controls described above, so that it is possible to drive the new ultrasonic motor 38 in an optimum state.

(Advantages)

The ultrasonic-motor driving apparatus of the second embodiment offers the same advantages as in the first embodiment. Furthermore, the number of lead wires in the transmission lines 35*a* and 35*b* for connecting the ultrasonic motor 38 to the driving circuit 45 is larger than the number of lead wires in a case where the ROM 8 is not provided by only one, so that it is possible to minimize an increase in external dimensions of the transmission lines 35*a* and 35*b* and to realize the ultrasonic-motor driving apparatus 39 in which the ultrasonic motor 38 is compatible with the driving circuit 45.

Figure 5:
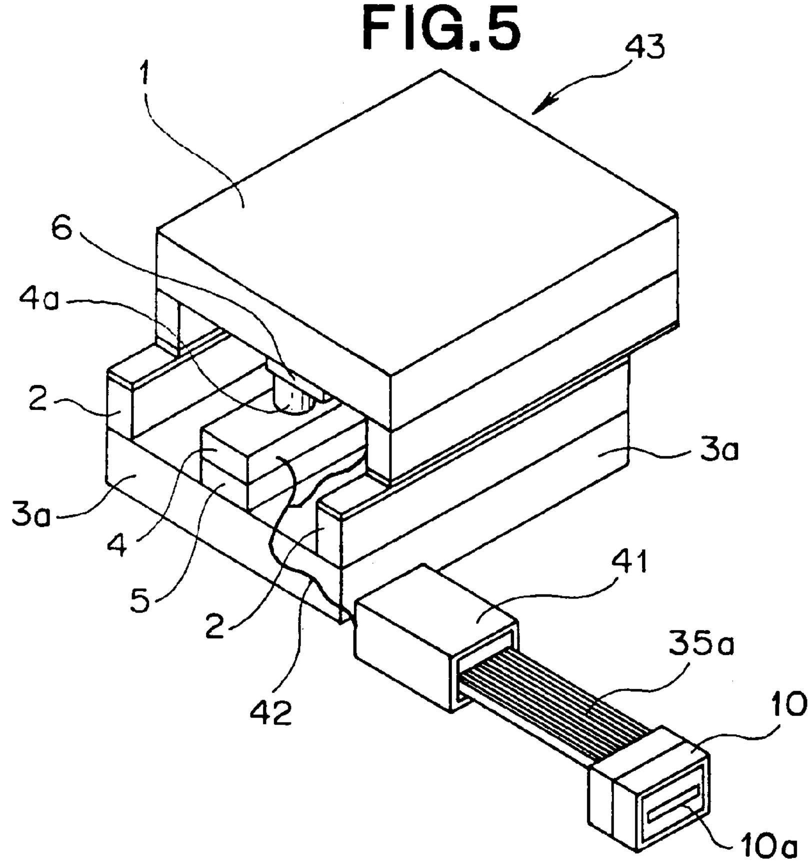
FIG. 5 is a perspective view showing the external configuration of an ultrasonic motor in an ultrasonic-motor driving apparatus according to a modification of the second embodiment of the present invention.
Figure 6:
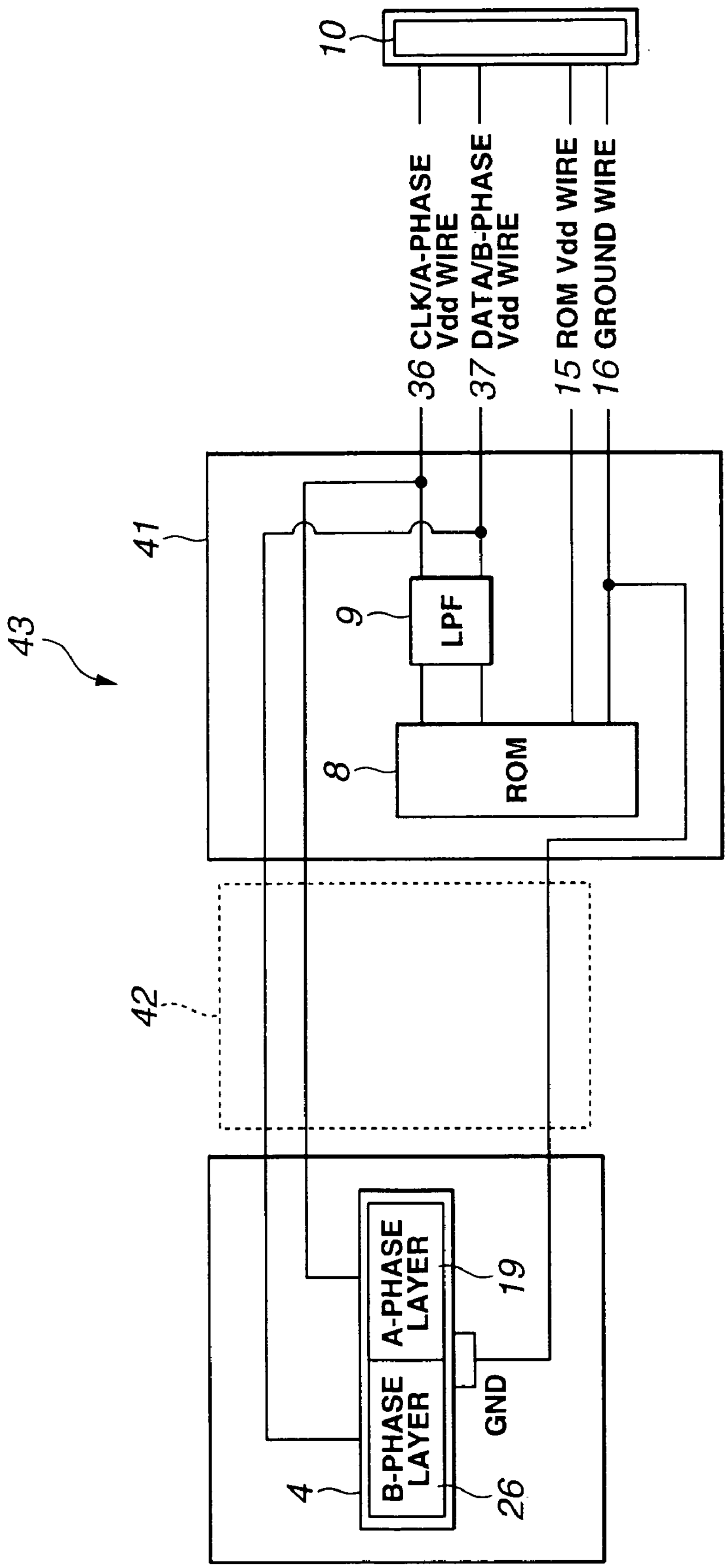
FIG. 6 is a block diagram showing the electrical circuitry of the ultrasonic motor in FIG. 5.

The ultrasonic-motor driving apparatus of the second embodiment may be structured in a manner shown in a modification in FIGS. 5 and 6 in order to further downsize the ultrasonic motor. The modification of the second embodiment will be described below.

Modification of Second Embodiment (Structure)

FIGS. 5 and 6 illustrate an ultrasonic-motor driving apparatus according to a modification of the second embodiment of the present invention. FIG. 5 is a perspective view showing the external configuration of an ultrasonic motor in the ultrasonic-motor driving apparatus. FIG. 6 is a block diagram showing the electrical circuitry of the ultrasonic motor. The same reference numerals are used in FIGS. 5 and 6 to identify the same components as in the ultrasonic-motor driving apparatus of the second embodiment. The description of such components is omitted here and only the components different from those in the ultrasonic-motor driving apparatus of the second embodiment will be described.

In order to further downsize an ultrasonic motor, the ultrasonic-motor driving apparatus of this modification is characterized in the shape of a base of the ultrasonic motor 43 and in an improvement in the arrangement of the ROM 8 and the LPF 9.

Specifically, as shown in FIG. 5, the ROM 8 and the LPF 9 are not provided on the base 3 but are housed in a box 41 in the ultrasonic motor 43 of this modification, unlike the first and second embodiments.

One side of the box 41 is electrically connected to the transducer 4 through a transmission line 42 in a state where the box 41 cannot be detached from the transducer 4. The other side of the box 41 is connected to the transmission line 35*a* similar to one shown in the second embodiment. The proximal end portion of the transmission line 35*a* is connected to the connector 10.

A board (not shown) having a print pattern for applying a drive voltage to the transducer 4 is also housed in the box 41. Electronic components such as the ROM 8 and the LPF 9 are mounted on the board.

The electrical circuitry of the ultrasonic-motor driving apparatus of this modification will now be described in detail with reference to FIG. 6.

In the ultrasonic motor 43 of this modification, the CLK/A-phase Vdd wire 36 is electrically connected to the A-phase layer 19, the data/B-phase Vdd wire 37 is electrically connected to the B-phase layer 26, and the ground wire 16 is electrically connected to the transducer 4, through the transmission line 42.

The ROM 8, the LPF 9, and the transmission line 35*a* in the box 41 are electrically connected in the same manner as in the second embodiment.

The electrical circuitry in the driving circuit electrically connected to the ultrasonic motor 43 through the connector 10 is also the same as in the second embodiment.

(Operation)

The ultrasonic-motor driving apparatus of this modification operates in approximately the same manner as the ultrasonic-motor driving apparatus of the second embodiment. Furthermore, since the ROM 8 and the LPF 9 are not provided on the base 3 in FIG. 1, but provided between the transmission line 35*a* and the transmission line 42, the base 3*a* can be easily downsized, compared with the base 3. Accordingly, it is possible to realize the ultrasonic-motor driving apparatus in which the ultrasonic motor 43 is compatible with the driving circuit and which has the same external dimensions as in a structure that does not have the ROM 8 and the LPF 9.

Since the transmission line 42 having an appropriate length allows the box 41 to be detached from the base 3*a*, the box 41 and the transmission line 35*a* can be used without hindering the installation of the ultrasonic motor 43 even when the ultrasonic motor 43 has a limited installation space.

The transmission line 42 has only three lead wires required for driving the ultrasonic motor 43, thus minimizing the external dimensions of the transmission line 42.

(Advantages)

According to-this modification, it is possible to realize a compact ultrasonic-motor driving apparatus while ensuring the compatibility between the ultrasonic motor 43 and the driving circuit 45. The compact ultrasonic motor 43 can improve flexibility in design.

This modification can be applied not only to the second embodiment but also to the first embodiment. The same operation and advantages are achieved in either case.

Third Embodiment (Structure)

Figure 7:
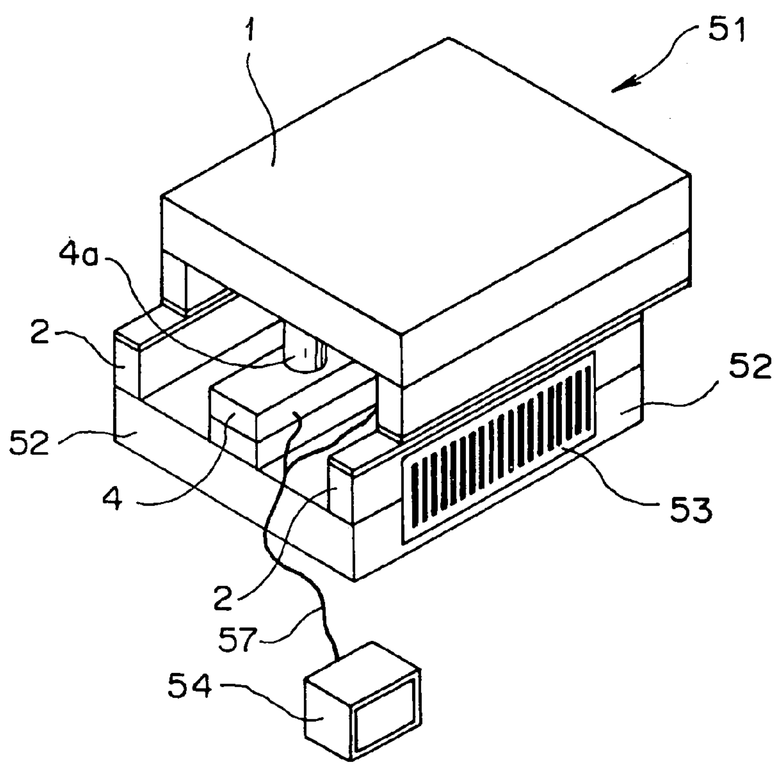
FIG. 7 is a perspective view showing the external configuration of an ultrasonic motor in an ultrasonic-motor driving apparatus according to a third embodiment of the present invention.
Figure 8:
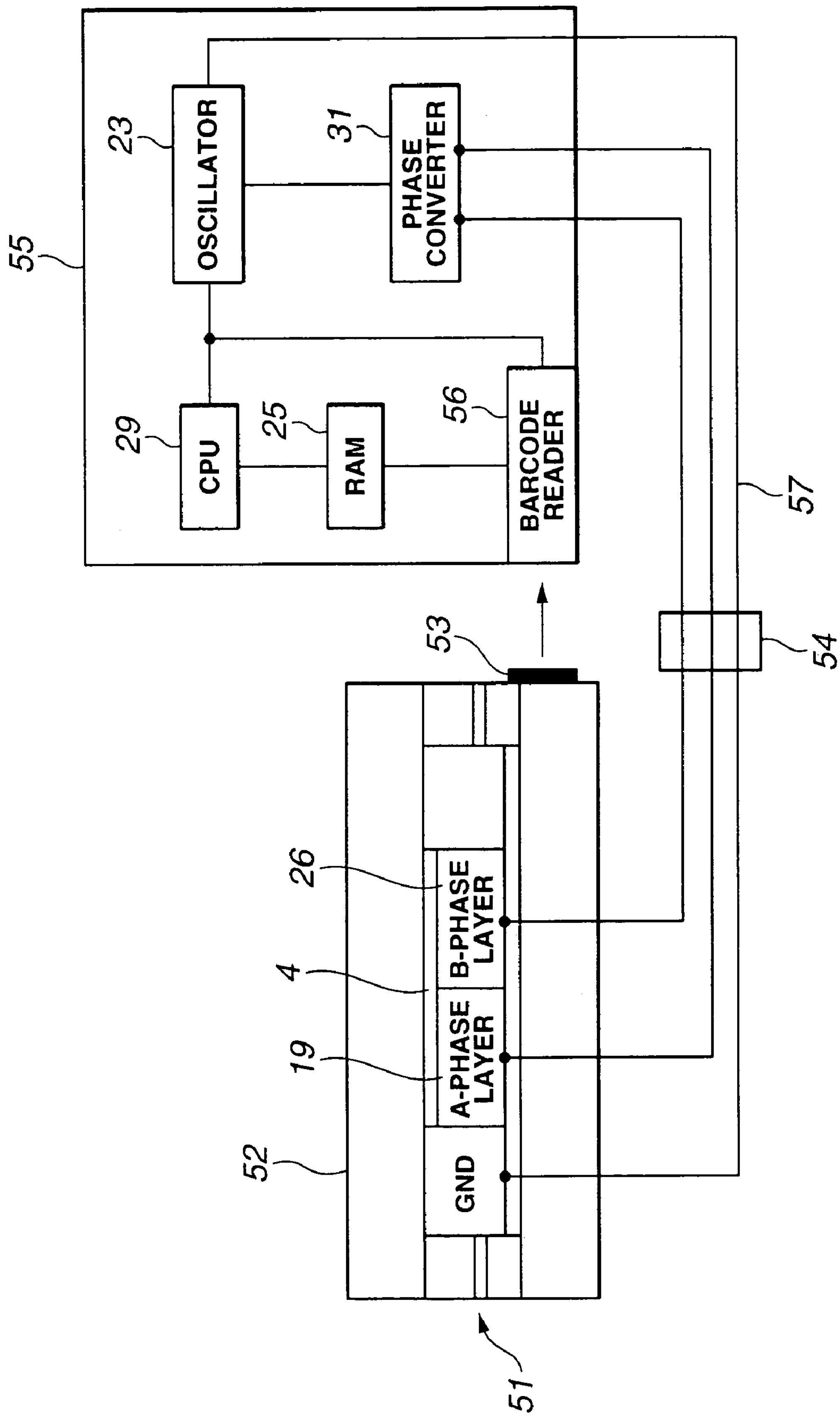
FIG. 8 is a block diagram showing the electrical circuitry of the ultrasonic-motor driving apparatus of the third embodiment.

FIGS. 7 and 8 illustrate an ultrasonic-motor driving apparatus according to a third embodiment of the present invention. FIG. 7 is a perspective view showing the external configuration of an ultrasonic motor in the ultrasonic-motor driving apparatus. FIG. 8 is a block diagram showing the electrical circuitry of the ultrasonic-motor driving apparatus.

The same reference numerals are used in FIGS. 7 and 8 to identify the same components as in the ultrasonic-motor driving apparatus of the first embodiment. The description of such components is omitted here and only the components different from those in the ultrasonic-motor driving apparatus of the first embodiment will be described.

The ultrasonic-motor driving apparatus of the third embodiment is characterized in that a barcode 53 having data optimal for driving an ultrasonic motor 51 is provided on the ultrasonic motor 51, in place of the ROM 8 in the first embodiment, and in that a barcode reader 56 for reading the data in the barcode 53 is provided in a driving circuit 55.

Specifically, the barcode 53 is adhered to a side face of a base 52 of the ultrasonic motor 51 in the ultrasonic-motor driving apparatus of the third embodiment, as shown in FIG. 7.

Values of a drive frequency Fr1 and a drive voltage V optimal for driving the ultrasonic motor 51 are written in the barcode 53.

One end of a transmission line 57 is connected to the transducer 4 and the other end thereof is connected to a connector 54 to be electrically connected to the driving circuit 55 shown in FIG. 8.

The base 52 of the third embodiment have approximately the same size and shape as in the modification of the second embodiment shown in FIG. 5, thus realizing the compact ultrasonic motor 51.

The electrical circuitry of the ultrasonic-motor driving apparatus of the third embodiment will now be described in detail with reference to FIG. 8.

In the ultrasonic-motor driving apparatus of the third embodiment, the provision of the barcode 53 on the ultrasonic motor 51 is accompanied by the provision of the barcode reader 56 corresponding to the barcode 53 in the driving circuit 55, as shown in FIG. 8.

The barcode reader 56 is connected so as to transmit the data value read by the barcode reader 56 to the RAM 25, which is connected so as to transmit the data value to the CPU 29.

The CPU 29 is electrically connected to the oscillator 23 connected to the phase converter 31 and to the barcode reader 56. One terminal of the phase converter 31 is electrically connected to the A-phase layer 19 in the transducer 4 through the connector 54, and the other terminal of the phase converter 31 is electrically connected to the B-phase layer 26 through the connector 54.

(Operation)

The operation of the ultrasonic-motor driving apparatus of the third embodiment will now be described with reference to FIGS. 7 and 8.

It is assumed that the ultrasonic motor 51 is to be replaced with a new ultrasonic motor 51 for the purpose of repair, inspection, or the like.

The ultrasonic motor 51 is electrically connected to the driving circuit 55 through the connector 54.

The ultrasonic motor 51 is installed such that the barcode 53 on the ultrasonic motor 51 is provided within a readable range of the barcode reader 56 in the driving circuit 55.

Power is applied from a power source (not shown) to the ultrasonic-motor driving apparatus.

The application of the power to the ultrasonic-motor driving apparatus invokes the CPU 29 serving as a controller. The CPU 29 specifies a data storage area in the RAM 25 in which data can be written. The CPU 29 then starts up the barcode reader 56, which reads the data value in the barcode 53 and transmits the read data value to the RAM 25. The CPU 29 writes the transmitted data value in the RAM 25 for storage.

The CPU 29 then determines a drive frequency Fr1 and a drive voltage V at which the ultrasonic motor 51 is driven with reference to the value written in the RAM 25, and causes the oscillator 23 to output the determined value. The oscillator 23 generates the drive frequency Fr1 and the drive voltage V optimal for driving the ultrasonic motor 51 based on the instruction supplied from the CPU 29.

The alternating voltage that is generated in the oscillator 23 and that has an appropriate phase difference given by the phase converter 31 is applied to the transducer 4 through the transmission line 57 to drive the ultrasonic motor 51.

Hence, when the ultrasonic motor 51 is replaced with a new ultrasonic motor 51, connecting the new ultrasonic motor 51 to the connector 54 modifies the drive frequency Fr1 and the drive voltage V to values corresponding to the new ultrasonic motor 51 based on the controls described above, so that it is possible to drive the new ultrasonic motor 51 in an optimum state.

(Advantages)

The ultrasonic-motor driving apparatus of the third embodiment offers the same advantages as in the first embodiment. Furthermore, it is possible to realize the ultrasonic-motor driving apparatus in which the ultrasonic motor 51 is compatible with the driving circuit 55 without increasing the external dimensions of the ultrasonic motor and the transmission line.

Although the barcode 53 is adhered to one side face of the base 52 in the third embodiment, the position where the barcode 53 is adhered to is not limited to the side face. The barcode 53 may be adhered to any position on the ultrasonic motor 51 as long as the barcode 53 can be read.

Although the barcode 53 is one printed on a seal in the third embodiment, the barcode 53 may be directly printed on the ultrasonic motor 51 with an inkjet printer, a laser marker, or the like.

The process of connecting the ultrasonic motor 51 to the driving circuit 55 through the connector 54 may not necessarily be performed first in the manner described above. It is enough to perform the process before driving the ultrasonic motor 51.

Fourth Embodiment (Structure)

An ultrasonic-motor driving apparatus according to a fourth embodiment of the present invention will now be described, although not shown. Only components different from those in the ultrasonic-motor driving apparatus of the third embodiment will be described.

The ultrasonic-motor driving apparatus of the fourth embodiment is characterized in that the barcode 53 in FIG. 7 in the third embodiment is replaced with a wireless ID tag and in that the barcode reader 56 in FIG. 8 is replaced with a receiver corresponding to the wireless ID tag.

Other structures are the same as in the third embodiment.

(Operation)

In the ultrasonic-motor driving apparatus of the fourth embodiment, the wireless ID tag transmits data concerning a drive frequency Fr1 and a drive voltage V optimal for driving the ultrasonic motor to the driving circuit, and the receiver in the driving circuit receives the transmitted data. The subsequent operations are the same as in the third embodiment.

(Advantages)

The ultrasonic-motor driving apparatus of the fourth embodiment offers the same advantages as in the third embodiment. Furthermore, since the durability of a storage, that is the wireless ID tag, in the ultrasonic motor can be improved in the fourth embodiment, compared with the third embodiment, it is possible to realize the ultrasonic-motor driving apparatus having a long life, in which the ultrasonic motor is compatible with the driving circuit.

Fifth Embodiment (Structure)

An ultrasonic-motor driving apparatus according to a fifth embodiment of the present invention will now be described, although not shown. Only components different from those in the ultrasonic-motor driving apparatuses of the first to third embodiments will be described.

In the ultrasonic-motor driving apparatus of the fifth embodiment, assuming that the ROM 8 (refer to FIGS. 2, 4, and 6), the barcode 53, or the wireless ID tag that are provided in or on the ultrasonic motor is a first storage, a drive voltage V written in the first storage is the parameter corresponding to one of the following voltages:

1. Forward drive voltage V1
2. Backward drive voltage V2
3. Voltage difference V3 between the forward drive voltage V1 and the backward drive voltage V2

For example, when the forward drive voltage V1 is written in the first storage, the backward drive voltage V2 is a drive rated voltage V4. The drive rated voltage V4 is a unique value independent of an individual ultrasonic motor and is written in the RAM 25 in advance.

When the backward drive voltage V2 is written in the first storage, the forward drive voltage V1 is the drive rated voltage V4 written in the RAM 25 in advance.

When the voltage difference V3 between the forward drive voltage V1 and the backward drive voltage V2 is written in the first storage, either the forward drive voltage V1 or the backward drive voltage V2 is the drive rated voltage V4 written in the RAM 25 in advance.

Other structures are the same as in one of the first to third embodiments.

(Operation)

In the ultrasonic-motor driving apparatus of the fifth embodiment, when the drive voltage V written in the first storage is the forward drive voltage V1, the forward drive voltage V1 is set such that driving characteristics, such as a speed or a torque, acquired when the ultrasonic motor is driven backward at the drive rated voltage V4 can be acquired when the ultrasonic motor is driven forward.

When the drive voltage V written in the first storage is the backward drive voltage V2, the backward drive voltage V2 is set such that driving characteristics, such as a speed or a torque, acquired when the ultrasonic motor is driven forward at the drive rated voltage V4 can be acquired when the ultrasonic motor is driven backward.

When the drive voltage V written in the first storage is the voltage difference V3 between the forward drive voltage V1 and the backward drive voltage V2, if the forward drive voltage V1 is stored in the RAM 25, the backward drive voltage V2 equals the drive rated voltage V4 plus the voltage difference V3. The arithmetic operation is performed by the CPU 29. If the backward drive voltage V2 is stored in the RAM 25, the forward drive voltage V1 equals the drive rated voltage V4 plus the voltage difference V3.

Other operations are the same as in one of the first to third embodiments.

(Advantages)

With the ultrasonic-motor driving apparatus of the fifth embodiment, the capacity of the first storage provided in the ultrasonic motor can be reduced, compared with the first to third embodiments.

The present invention is not limited to the first to fifth embodiments and the modification described above. Combination or applications of the first to fifth embodiments and the modification can also be applied to the present invention within the scope of the present invention.

In this invention, it is apparent that various modifications different in a wide range can be made on the basis of this invention without departing from the spirit and scope of the invention. This invention is not restricted by any specific embodiment except being limited by the appended claims.

What is claimed is:

1. An ultrasonic-motor driving apparatus comprising:

an ultrasonic motor;

a driving unit including a driving circuit for driving the ultrasonic motor, the driving unit being detachable from the ultrasonic motor; and a characteristic storage, provided in the ultrasonic motor, for storing driving characteristic values of a resonant frequency and a drive voltage signal specific to the ultrasonic motor, wherein the driving circuit drives and controls the ultrasonic motor based on the driving characteristic values stored in the characteristic storage.

2. An ultrasonic-motor driving apparatus according to claim 1, wherein the ultrasonic motor includes a first storage acting as the characteristic storage and a first low-pass filter connected to the first storage, wherein the driving unit includes a second storage capable of at least temporarily storing the driving characteristic values stored in the first storage and a second low-pass filter connected to the second storage, and wherein the ultrasonic-motor driving apparatus further includes, between the ultrasonic motor and the driving unit, a transmission line through which the driving characteristic values stored in the first storage are transmitted to the second storage through the first and second low-pass filters.

3. An ultrasonic-motor driving apparatus according to claim 2, wherein both signals concerning the driving characteristic values and the drive voltage signal of the ultrasonic motor are transmitted through the transmission line.

4. An ultrasonic-motor driving apparatus according to claim 1, wherein the ultrasonic motor includes a barcode acting as the characteristic storage, and wherein the driving unit includes a barcode reader for reading the driving characteristic values stored in the barcode.

5. An ultrasonic-motor driving apparatus according to claim 1, wherein the ultrasonic motor includes a wireless identification tag acting as the characteristic storage, and wherein the driving unit includes a receiver for reading the driving characteristic values stored in the wireless identification tag.

6. An ultrasonic-motor driving apparatus according to claim 1, wherein a value of the drive voltage signal is a forward drive voltage, a backward drive voltage, or a voltage difference between the forward drive voltage and the backward drive voltage.

7. An ultrasonic-motor driving apparatus according to claim 6, wherein the ultrasonic motor includes a first storage acting as the characteristic storage and a first low-pass filter connected to the first storage, wherein the driving unit includes a second storage capable of at least temporarily storing the driving characteristic values stored in the first storage and a second low-pass filter connected to the second storage, and wherein the ultrasonic-motor driving apparatus further includes, between the ultrasonic motor and the driving unit, a transmission line through which the driving characteristic values stored in the first storage are transmitted to the second storage through the first and second low-pass filters.

8. An ultrasonic-motor driving apparatus according to claim 7, wherein both signals concerning the driving characteristic values and the drive voltage of the ultrasonic motor are transmitted through the transmission line.

9. An ultrasonic-motor driving apparatus according to claim 6, wherein the ultrasonic motor includes a barcode acting as the characteristic storage, and wherein the driving unit includes a barcode reader for reading the driving characteristic values stored in the barcode.

10. An ultrasonic-motor driving apparatus according to claim 6, wherein the ultrasonic motor includes a wireless identification tag acting as the characteristic storage, and wherein the driving unit includes a receiver for reading the driving characteristic values stored in the wireless identification tag.

11. An ultrasonic-motor driving apparatus comprising:

an ultrasonic motor;

a driving unit including a driving circuit for driving the ultrasonic motor, the driving unit being detachable from the ultrasonic motor; and a characteristic storage, provided in the ultrasonic motor, for storing driving characteristic values of a resonant frequency and a drive-voltage phase difference specific to the ultrasonic motor, wherein the driving circuit drives and controls the ultrasonic motor based on the driving characteristic values stored in the characteristic storage.

12. An ultrasonic-motor driving apparatus according to claim 11, wherein the ultrasonic motor includes a first storage acting as the characteristic storage and a first low-pass filter connected to the first storage, wherein the driving unit includes a second storage capable of at least temporarily storing the driving characteristic values stored in the first storage and a second low-pass filter connected to the second storage, and wherein the ultrasonic-motor driving apparatus further includes, between the ultrasonic motor and the driving unit, a transmission line through which the driving characteristic values stored in the first storage are transmitted to the second storage through the first and second low-pass filters.

13. An ultrasonic-motor driving apparatus according to claim 12, wherein both signals concerning the driving characteristic values and the drive-voltage phase difference of the ultrasonic motor are transmitted through the transmission line.

14. An ultrasonic-motor driving apparatus according to claim 11, wherein the ultrasonic motor includes a barcode acting as the characteristic storage, and wherein the driving unit includes a barcode reader for reading the driving characteristic values stored in the barcode.

15. An ultrasonic-motor driving apparatus according to claim 11, wherein the ultrasonic motor includes a wireless identification tag acting as the characteristic storage, and wherein the driving unit includes a receiver for reading the driving characteristic values stored in the wireless identification tag.

16. An ultrasonic-motor driving apparatus according to claim 11, wherein a value of the drive-voltage phase difference is a forward-drive-voltage phase difference, a backward-drive-voltage phase difference, or a difference between the forward-drive-voltage phase difference and the backward-drive-voltage phase difference.

17. An ultrasonic-motor driving apparatus according to claim 16, wherein the ultrasonic motor includes a first storage acting as the characteristic storage and a first low-pass filter connected to the first storage, wherein the driving unit includes a second storage capable of at least temporarily storing the driving characteristic values stored in the first storage and a second low-pass filter connected to the second storage, and wherein the ultrasonic-motor driving apparatus further includes, between the ultrasonic motor and the driving unit, a transmission line through which the driving characteristic values stored in the first storage are transmitted to the second storage through the first and second low-pass filters.

18. An ultrasonic-motor driving apparatus according to claim 17, wherein both signals concerning the driving characteristic values and the drive-voltage phase difference of the ultrasonic motor are transmitted through the transmission line.

19. An ultrasonic-motor driving apparatus according to claim 16, wherein the ultrasonic motor includes a barcode acting as the characteristic storage, and wherein the driving unit includes a barcode reader for reading the driving characteristic values stored in the barcode.

20. An ultrasonic-motor driving apparatus according to claim 16, wherein the ultrasonic motor includes a wireless identification tag acting as the characteristic storage, and wherein the driving unit includes a receiver for reading the driving characteristic values stored in the wireless identification tag.

* * * * *